Patented Jan. 6, 1931

1,787,497

UNITED STATES PATENT OFFICE

CARL THEODOR THORSSELL, OF CASSEL, GERMANY

PROCESS FOR THE PRODUCTION OF POTASSIUM SULPHATE AND SODA

No Drawing. Application filed February 25, 1930, Serial No. 431,336, and in Germany March 5, 1929.

As is known, potassium sulphate is prepared by the reaction of potassium chloride with magnesium sulphate. Consequently the manufacture of potassium sulphate has hitherto been dependent for the most part on crude salts containing kieserite.

The present invention relates to a process, whereby it is possible also to prepare potassium sulphate, while simultaneously obtaining soda, from a sylvinite free from kieserite.

Calcium or strontium sulphate is used as source of sulphuric acid.

It is known that ammonium sulphate reacts with alkali chlorides under certain conditions to form ammonium chloride and alkali sulphates.

If sylvinite, which consists mainly of KCl and NaCl is stirred into a lye of a certain composition, which contains $NH_4Cl$, $(NH_4)_2SO_4$ and $NH_3$, glaserite and potassium chloride are obtained as deposited substances.

The essential point of the present process consists in conducting a self-contained process whereby the products potassium sulphate and soda are obtained, in such a way that a lye of above-mentioned composition is always recovered.

The lye must contain as much $(NH_4)_2SO_4$ as corresponds to the quantity of KCl in the crude salt. It is prepared from the mother liquor of an ammonia soda process, which is described more fully below. The composition of this mother liquor is given by the Solvay process. A mother liquor of this kind contains $NaHCO_3$, $NH_4Cl$ and $NH_4HCO_3$ or $(NH_4)_2CO_3$ in addition to unconverted NaCl.

It is known that calcium and strontium sulphate react with ammonium carbonate to form ammonium sulphate and calcium or strontium carbonate. This reaction known per se requires a considerable time owing to the poor solubility of the two initial sulphates.

The invention is based on the knowledge that the mother liquor from the Solvay process is very particularly suited for this reaction, because the solubility of calcium or strontium sulphate is increased in the presence of other salts, for instance chlorides and the reaction speed is thus accelerated. Ammonium chloride and sodium chloride act particularly favourably in this case (cf. Abegg, Volume II, section 2, pages 138 and 224).

The Solvay mother liquor is stirred with so much calcium or strontium sulphate, that the ammonium sulphate formed is equivalent to the KCl contained in the crude salt.

The Solvay mother liquor has a temperature adapted to this conversion, say 30–40° C. and contains—if the usual type of crude sylvinitic salts is used as initial material—, a substantial excess of ammonium carbonate, which promotes the rection.

In this operation the carbonate acid bound as bicarbonate is liberated and can be collected and re-introduced into the process.

The $CaCO_3$ or $SrCO_3$ formed is separated and a crude sylvinitic salt stirred into the lye.

During this stirring ammonia is introduced while at the same time cooling, the above-mentioned deposit consisting of glaserite and potassium chloride being obtained. This deposited substance is separated and converted by treatment with water into solid potassium sulphate.

Sodium bicarbonate is precipitated according to the Solvay process from the mother liquor from the formation of glaserate.

In addition to some ammonium carbonate the mother liquor contains mainly NaCl, $NH_4Cl$ and $NH_3$.

In order to be able to use this mother lye for the Solvay process, it must first be freed from any $NH_4Cl$, which takes place simply by cooling. This cooling can be effected wholly or partially by withdrawing by suction the free ammonia in the lye.

The lye prepared in this way is treated in a known manner according to the Solvay process with $NH_3$ and $CO_2$ in which case $NaHCO_3$ is obtained.

The mother lye obtained from this process—as stated above—after stirring with calcium or strontium sulphate represents the initial lye for the sulphate process.

The new process increases in importance if the potassium sulphate obtained in such a case is used for a process in which calcium or strontium sulphate are formed.

Such a process is for instance the known decomposition of crude phosphate with a mixture of nitric acid and potassium sulphate.

The gypsum obtained in such a case is then re-introduced into the above described potassium sulphate process, and thus a completely self-contained process is provided, in which the products soda, ammonium chloride, potassium nitrate and ammonium phosphate (or a mixture of the two last) are prepared from crude sylvinitic potash salt, crude phosphate, nitric acid, ammonia and carbonic acid, sulphuric acid remaining in circulation.

A further process of this kind, in which strontium sulphate is obtained, is as follows:—

Potassium sulphate is converted with strontium hydrate to potassium hydrate and strontium sulphate, in which case, as is known, a relatively strong solution of potassium hydrate is obtained, the resulting strontium sulphate is introduced again into the above described potassium sulphate process and the strontium carbonate thus formed, is converted into strontium oxide or hydrate, so that with the same employment of a completely self-contained cycle process the products potassium hydrate, soda and ammonium chloride are prepared from sylvinite, ammonia and carbonic acid, in which case sulphuric acid remaining in circulation.

Having now particularly described and ascertained the nature of my said invention and in what manner the same is to be performed, I declare that what I claim is:—

1. A process for the production of potassium sulphate and soda from crude sylvinitic salt with calcium or strontium sulphate, consisting in mixing sodium bicarbonate mother liquor obtained from the Solvay process with calcium or strontium sulphate, separating the carbonate formed, treating the remaining liquor with crude sylvinitic potash salt and ammonia, separating the glaserite and potassium chloride formed, cooling the mother liquor for removing the ammonium chloride contained therein, treating the remaining mother liquor by the Solvay process for the production of bicarbonate mixing the resulting mother liquor with calcium or strontium sulphate again, as and for the purpose set forth.

2. A process for the production of potassium sulphate and soda from crude sylvinitic salt with calcium or strontium sulphate, as claimed in claim 1 and in which the said mixture of glaserite and potassium chloride is treated with water for converting the same into potassium sulphate, as set forth.

3. The employment of the potassium sulphate obtained by the process claimed in claim 1, for a process in which calcium or strontium sulphate is formed, and the use of these latter sulphates for producing further potassium sulphate according to the process claimed in claim 1, as set forth.

In testimony whereof I have signed my name to this specification.

CARL THEODOR THORSSELL.